United States Patent [19]

Anselm

[11] Patent Number: 5,763,832
[45] Date of Patent: Jun. 9, 1998

[54] APPARATUS FOR AFFIXING A STRAIN WIRE INTO THE WIRING OF FLEXIBLE ELECTRIC CONDUIT

[76] Inventor: Anthony C. Anselm, 317 Stoneyhill Dr., Chalfont, Pa. 18914

[21] Appl. No.: 778,874

[22] Filed: Jan. 2, 1997

[51] Int. Cl.⁶ ............................................. H02G 3/18
[52] U.S. Cl. .................... 174/65 R; 174/135; 285/114
[58] Field of Search .......................... 174/65 R, 51, 174/135; 248/56; 285/114

[56] References Cited

U.S. PATENT DOCUMENTS

| | | | |
|---|---|---|---|
| 1,204,625 | 11/1916 | Wheelock | 248/56 X |
| 2,250,685 | 7/1941 | Tiefenbacher et al. | 174/65 R X |
| 2,674,470 | 4/1954 | Appleton | 174/51 X |
| 3,076,655 | 2/1963 | Washburn, Jr. | 174/65 R X |
| 3,104,120 | 9/1963 | Myers | 174/51 X |
| 3,643,290 | 2/1972 | Milne | 248/56 X |
| 4,312,563 | 1/1982 | Mead | 350/96.2 |
| 4,616,105 | 10/1986 | Borsh | 174/65 R |
| 4,711,974 | 12/1987 | Borsh | 174/65 R |
| 4,809,937 | 3/1989 | Emory, Jr. | 248/56 |
| 5,090,644 | 2/1992 | Lenker | 248/56 |

FOREIGN PATENT DOCUMENTS

| | | | |
|---|---|---|---|
| 1602183 | 11/1970 | France | 174/65 R X |
| 2717534 | 11/1978 | Germany | 174/65 R X |
| 630518 | 2/1994 | Japan | 174/65 R X |
| 734468 | 8/1955 | United Kingdom | 174/135 X |
| 2095051 | 9/1982 | United Kingdom | 174/65 R X |

*Primary Examiner*—Kristine L. Kincaid
*Assistant Examiner*—Dean A. Reichard
*Attorney, Agent, or Firm*—Woodcock Washburn Kurtz Mackiewicz & Norris LLP

[57] ABSTRACT

A junction box connector and resulting assembly are disclosed that facilitate the inclusion of a strain wire. The strain wire relieves the load placed upon the cable or flexible conduit and cable combination that extends between the junction box and another similar connection. In a preferred embodiment, a connector that has a section extending inside the junction box is provided with a longitudinal slit, and the strain wire is placed within this slit. A locking device such as a threaded nut presses the wire down against the side of the junction box, creating a mechanical clamping effect, thereby providing an appropriate connection able to resist loads placed upon the structure. Preferably, the present invention is used with flexible conduit and the flexible conduit encapsulates an integral strain wire. In certain embodiments, the flexible conduit is filled with fire resistant material and marked with standard units of length.

12 Claims, 3 Drawing Sheets

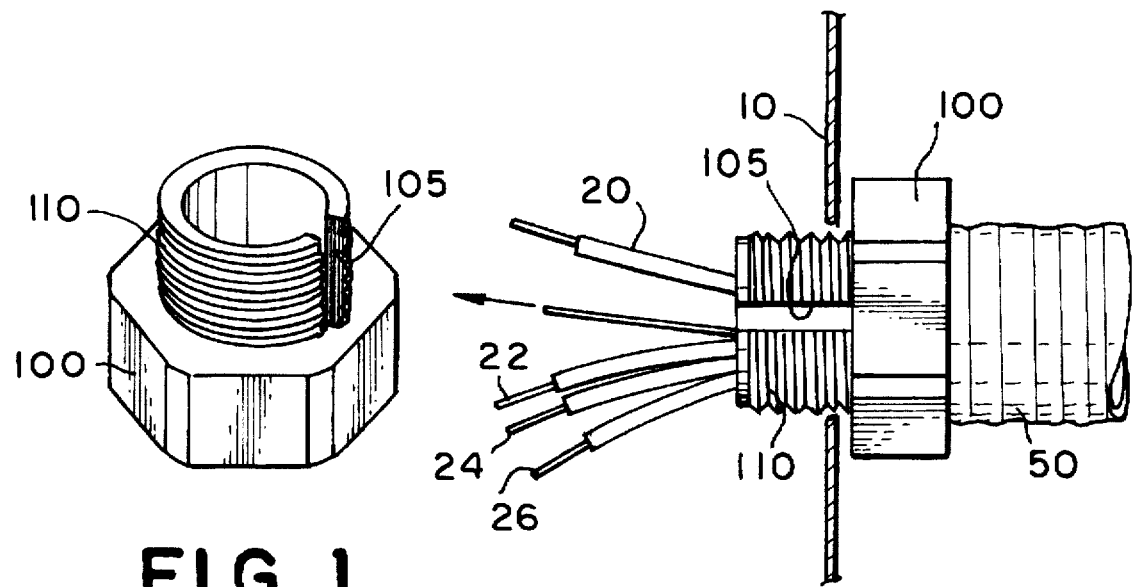
FIG. 1
FIG. 2
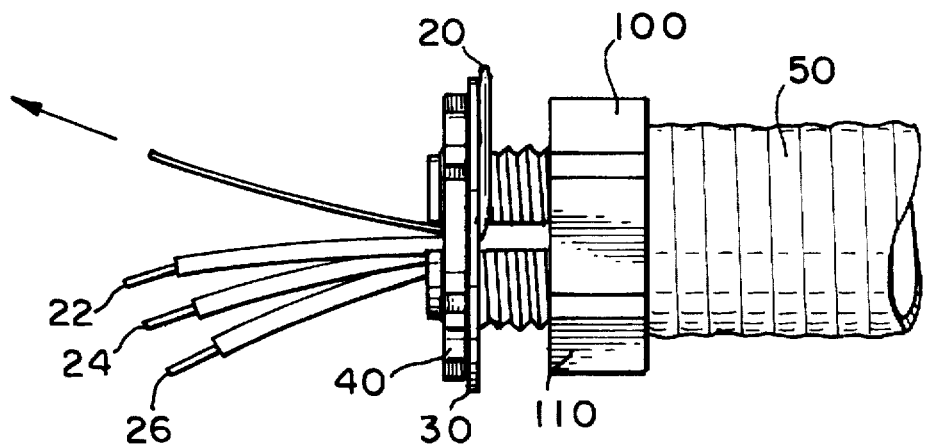
FIG. 3

APPARATUS FOR AFFIXING A STRAIN WIRE INTO THE WIRING OF FLEXIBLE ELECTRIC CONDUIT

The present invention relates to wiring and cabling, junction boxes, conduit and the like, and more specifically relates to the mechanical connections between conduit or cable and associated structures.

BACKGROUND OF THE INVENTION

It is known to provide a strain wire between points of an electrical circuit so that the cable or a conduit containing a cable does not need to bear its own weight and the weight of other loads placed on it. However, the use of strain wires is relatively limited in application, the most well known being their use between high tension towers. Typically, a strain wire is not connected by the electrician in the final assembly of a conventional junction box. This is a typical situation because there are no metal clamps available in the many varieties of junction boxes on the market, even if a strain wire was available. Consequently any earth tremor, accidental pressure, additional weight factor, or load created when the cable is used as a stepping loop on machine tools could result in a disconnection of the cable termination either from a twist nut or miniature screw connection, causing a fire induced by an electric spark as well as other problems.

Thus, in current practice, electric cables or conductors are actually bearing the weight of the copper conductors and the so-called protective flexible conduit.

The testing procedure mandated by Underwriters Laboratories (UL) involves a pull out test of 300 lbs. on a length of ½" ID plastic conduit, against the assembled fitting. The reason for this high test load is that possibly the conduit could become a lifeline if grabbed by a person. During this test, the flexible conduit elongates by as much as 80%, thus demonstrating that there is no longitudinal protection of the inserted cable nor the flexible conduit as anticipated, whether the flexible conduit is made of metal or plastic. In such circumstances, the wires (not being extendable) would be pulled out of the junction box terminal screws.

Therefore, it would be desirable to provide method and apparatus by which a strain wire is easily incorporated into an electrical circuit, particularly one that uses a cable sheathed in a flexible conduit.

SUMMARY OF THE INVENTION

With the advent of continuous encapsulation of electrical cables while the conduit is being manufactured, it is now a possibility also to include a strain-wire together with the cables, thus eliminating the above-mentioned to oversight at the final assembly stage. The present invention takes advantage of this advance in the art by providing a connector that has a tubular portion extending within the junction box upon assembly that has a longitudinal slot within this tubular portion. In preferred embodiments, the tubular portion is threaded in a section of the connector that remains outside the junction box and is in the shape of a hexagonal nut. In differing embodiments of the present invention, the connector can either be made of plastic or metal, but is most preferably made of plastic. In accordance with preferred embodiments of the present invention the connector is one that is adapted to receive a flexible conduit. Thus, the present invention provides an improved junction box assembly that is able to provide a mechanical connection for a strain wire in a junction box by providing a connector that has a longitudinal slot wherein the strain wire is placed in the slot and when a locking device is installed to clamp the connector in place, the strain wire is urged against the side of the junction box. In differing embodiments, the strain wire may be lodged between the inner surface of the junction box and the locking device itself, or, alternatively, the strain wire may be placed such that it remains outside the interior of the junction box and is urged between the external portion of the connector and the exterior surface of the junction box. In certain embodiments, a resilient washer can be placed between the strain wire and the locking device, or between the strain wire and the exterior portion of the connector.

The present invention also provides methods of reducing mechanical strain on connections between junction boxes by interconnecting a cable to a junction box and then threading a strain wire integral with the cable through a connector in each junction box and then placing a strain wire within the longitudinal slot in the connector. A locking device is then connected to the connector and the locking device compresses a strain wire against a surface of the junction box, either the external surface or the interior surface as described above.

Thus, the present invention provides significant improvements to the use of flexible conduit between junction boxes. With the advent of the safety features provided by the present invention it is now possible to incorporate a non-metallic strain wire, or strain absorbing structure into a flexible conduit by integral molding with the conduit and then further safety advantages can be gained by filling the conduit with a mastic material, most preferably a fire resistant mastic material, and thus significantly reducing the likelihood of a fire caused by a cable that has been pulled loose from a junction box. In some preferred embodiments, the flexible cable also incorporates markings which indicate standardized units of length.

BRIEF DESCRIPTION OF THE DRAWINGS

FIG. 1 is a perspective view of a junction box connector made in accordance with the present invention;

FIG. 2 is a side elevation view of the connector of FIG. 1 during the first stages of its being installed in a junction box;

FIG. 3 is a side elevation view, similar to FIG. 1, illustrating the finished connection;

DETAILED DESCRIPTION OF THE INVENTION

Those of skill in the art will readily appreciate that a cable strain-wire is only as strong as its connection from one junction or switch box to another. At present, as explained above, the weakest link is that there are no provisions in electrical junction boxes to affix a strain wire, principally as it would be impossible to install mechanical clamping cleats on the many varieties of junction boxes available. To overcome the tensile strain on the cables being transferred to electrical terminal blocks, with no clamping possibility, the present invention provides a simple, modified cable connector to affix to the end of the flexible conduit to the junction box. As is well known in the art, it is typical to terminate all flexible conduits with a round threaded connector, which after assembly to the conduit is inserted through a knock-out hole on the side of the junction or switch box, and affixed by a lock nut. The conduit connector of the present invention has a vertical slot placed such that the strain-wire, after being trimmed from the cables, can pass through the base of the slot to the outside of the connector. After being inserted under the lock nut with an appropriate metal washer, the strain wire will be locked in place due to the clamping action of the lock nut and will resist an accidental pull of 500 lbs. or more, according to the strength of the wire.

The present invention therefore provides an improved flexible electrical cable, giving the cable longitudinal protection, and eliminating the possibility of being pulled out. Additionally, the present invention can be incorporated into flexible conduit systems at little cost.

Figure 6:
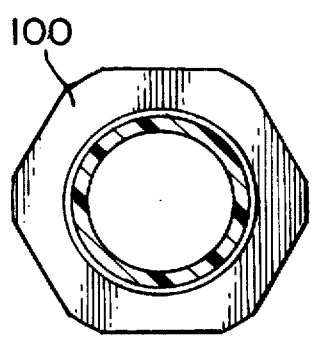
FIG. 6 is a top plan view of the connector illustrated in FIG. 1.
Figure 7:
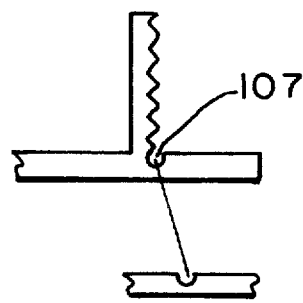
FIG. 7 is a broken-away side view of the connector illustrated in FIG. 6.

Referring now to FIG. 1, a preferred embodiment of the apparatus of the present invention is illustrated. A typical junction box connector 100 is modified by creating a slot 105 longitudinally along the connecting threads 110. The rest of the connector 100 preferably remains unaltered. As seen in FIG. 2, the modified connector 100 is inserted into a junction box 10 or other panel (shown broken away) such that one portion is outside and the threaded portion 110 extends to the inside section of the box. A sheathed cable 50 is connected to the proximal end of the connector 110, and after passing through the wall 10 of the junction box, is separated into individual wires 20,22,24,26 in typical fashion. It will be appreciated that the number, size and relative placement of the wires 20,22,24,26 is not part of the invention and they can be of any number, style and type. Moreover, as used herein, the term "wire" is meant in the generic sense, to a wire that is, twisted, insulated, uninsulated, etc. Additionally, one or more of the "wires" referred to could be nonconductors, such as pneumatic tubes, or could be fiber optic cables, or other types of cabling devices, such as RF transmission lines, coaxial cable and the like. A further detail of certain preferred embodiments of the connector 100 shown in FIG. 1 is shown in FIGS. 6 and 7. As seen in FIG. 7 the slot 105 ends with a recess or relief section 107 in certain preferred embodiments, as explained below, so that the strain wire will lie within this recess 107 and further components placed against the connector 100 will lie flat in accordance with the original construction of the connector and junction box.

Figure 4:
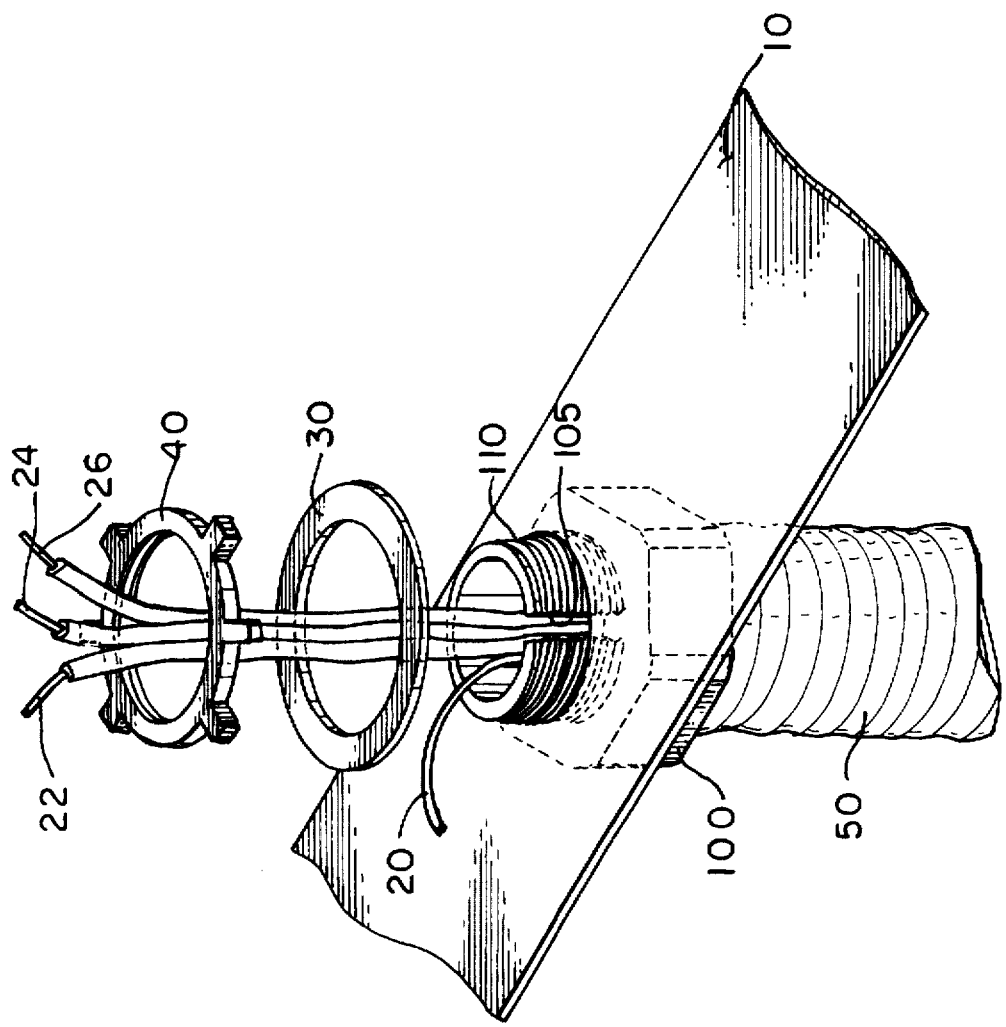
FIG. 4 in exploded view of the apparatus illustrated in FIG. 3.

In accordance with the present invention, at least one strain wire 20 is supplied. Preferably, the strain wire is encapsulated in flexible conduit although the present invention can be used with systems other than flexible conduit. Referring now to FIG. 3, it can be appreciated that as the assembly is completed, the strain wire 20 is bent so that it is lodged in the slot 105 in the connector 100. A compliant washer 30 is preferably slipped over the threads 110, followed by a standard threaded ring or nut 40. The act of threading the nut 40 down the connector threads 110 compresses the washer 30 and urges the strain wire 20 into a tight mechanical connection with the junction box 10. This aspect of the invention can also be seen in FIG. 4, where the exploded view permits illustration of the stain wire 20 prior to its being compressed by the threaded connection. The strain wire can be an insulated or uninsulated copper wire, or more preferably is an "aircraft cable" comprised of a thin twisted steel sheathed cable.

It should be noted that in certain embodiments, the compliant washer may be omitted or supplanted with a rigid washer or another type of insert.

Figure 5:
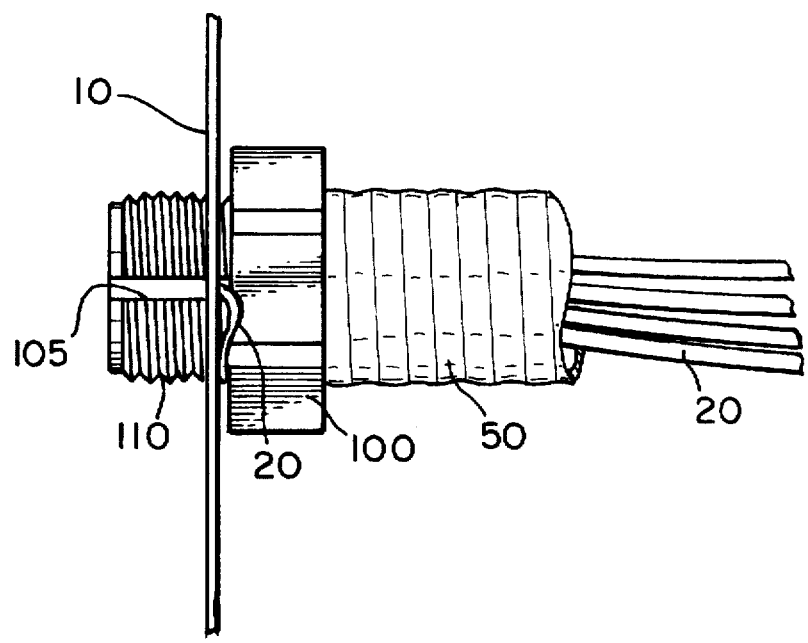
FIG. 5 is a side elevation view similar to FIG. 3 of an alternative embodiment of the present invention.

Referring now to FIG. 5, an alternate embodiment of the present invention is illustrated. In this embodiment, it can be seen that the strain wire 20 is placed in the slot 105 such that it remains outside the junction box and thus is urged between the junction box 10 and the portion of the connector that remains outside the junction box upon assembly. As with the embodiments described above, a resilient washer may be placed between the strain wire 20 and the connector 100 in order to provide a more stable connection, as well as to substantially seal the connection against dust, moisture, etc. As also described above, in such embodiments the strain wire may either be metallic or non-metallic and is most preferably molded integrally with the flexible conduit.

As mentioned above, one example of the necessity to utilize a strain wire is between power or telephone poles, where a steel wire is tensioned between the poles and the insulated cables or copper conductors are suspended at intervals of approximately three to four feet—thus no strain is placed on the cable. In preferred embodiments, the present invention incorporates a tension strain-wire into lengths of flexible conduit that are assembled as the flexible conduit is manufactured, and cut to required lengths on site. The cables are preferably formed into an aluminum strip encapsulating all wires with the strain-wire, giving support to the media which is centralized in the flexible conduit.

In such embodiments, additional fire insulation media could be injected in mastic form around the encapsulated cables, thus assisting centralization of the latter. The total conduit could also be injected with a suitable fire protective media. The flexible mastic fire resistant compound is injected continuously as the conduit is being continuously extruded over the electric cable and encapsulating same. However, it is prudent to plug each end of the conduit to prevent any discharge of the mastic from the conduit, thus leaving air cavities. Even without a mastic encapsulation to prevent ingress of dirt particles, moisture, air etc., in the advent of an internal short circuit or fire, oxygen is the best fire propagator, and its ingress should be blocked from entering the conduit.

A removable plug irrespective of size could be made in the shape of a finger stall, which can be inserted into the end of the conduit by using a long hollow nozzle affixed to the end of a collapsible tube containing the fire resistant mastic, similar to a tube of silicon bath sealing mastic. Such injection of mastic would take the shape of the internal end of the conduit, and surround the cable exit. If it is required to extract a flexible plug, a loop of material such as a paper clip, textile cloth or similar could be embedded to enable the flexible plug to be extracted. It is preferable to seal all wire terminals in the junction box as an extra fire barrier by injecting the mastic through an open mesh fiberglass cloth to assist locking, and to keep terminal nuts and screws secure. It is also preferred to have an extra fire barrier by spiral lapping the cable with polyurethane, or aluminum and PTFE tape which can resist a fire break-out up to 540° (Fahrenheit 280° Centigrade).

Overloaded power cables are a recognized cause of electrical short circuits and fires. To give a visual indication of the increased temperature of the overloaded cables a heat sensitive paint, which changes color due to elevated temperature, is applied to the encapsulated conduit system either longitudinally on the cable covering, or on a prescribed fitting.

It is further proposed that the strain wire could serve two additional purposes:

(1) The high clamping pressures on embodiments using conductive strain wire or wires, as in aircraft cables, would make an efficient clamping connection to the face of a metal junction or switch box, providing a reliable ground or earth connection; and (2) The strain wire could also be used for pulling or fishing wires to pull through additional cables prior to being assembled, as in FIGS. 1–4.

A further improvement is to emboss or imprint an identification mark every foot or other standard unit of length, thus facilitating cutting to length by an electrician when cutting the encapsulated cables.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A connector for connecting an electrical conduit having a strain wire to a junction box, said connector comprising a tubular portion extending within the junction box upon assembly, further comprising a longitudinal slot within at least the tubular portion, and a locking device for engaging the tubular portion, wherein the strain wire is placed within the slot and the locking device urges the strain wire against a surface of the junction box.

2. The connector of claim 1, wherein the tubular portion is threaded.

3. The connector of claim 1, wherein the connector further comprises a section remaining outside the junction box upon assembly that is shaped as a hexagonal nut.

4. The connector of claim 1, wherein the connector is made of metal.

5. The connector of claim 1, wherein the connector is made of plastic.

6. The connector of claim 3, wherein the section remaining outside the junction box includes a section adapted to receive a flexible conduit.

7. A junction box assembly comprising a junction box having a hole for receiving a connector; a connector comprising a tubular portion extending within the junction box having a longitudinal slot within at least the tubular portion; and a locking device for engaging the tubular portion, wherein a strain wire is placed within the slot and the locking device urges the strain wire against a surface of the junction box.

8. The assembly of claim 7, further comprising a resilient washer interposed between the strain wire and the locking device urging against the strain wire.

9. The assembly of claim 7, wherein the locking device comprises a threaded member and the tubular portion of the connector further comprises mating threads.

10. The assembly of claim 8, wherein the connector receives a flexible conduit.

11. The assembly of claim 10, wherein the strain wire is encapsulated within the flexible conduit.

12. The assembly of claim 8 wherein the strain wire comprises a steel cable encapsulated in a plastic sheath.

\* \* \* \* \*